(12) United States Patent
Naidu Pujala et al.

(10) Patent No.: US 9,582,396 B2
(45) Date of Patent: Feb. 28, 2017

(54) TECHNIQUES FOR GENERATING AN EXECUTABLE DEBUGGER SCRIPT

(75) Inventors: Rajasekharam Naidu Pujala, Prakasam District (IN); Vijay Kumar Alur Thirupathi, Bellary District (IN)

(73) Assignee: Novell, Inc., Provo, UT (US)

( * ) Notice: Subject to any disclaimer, the term of this patent is extended or adjusted under 35 U.S.C. 154(b) by 1043 days.

(21) Appl. No.: 12/604,777

(22) Filed: Oct. 23, 2009

(65) Prior Publication Data
US 2011/0099538 A1   Apr. 28, 2011

(51) Int. Cl.
G06F 9/44 (2006.01)
G06F 9/45 (2006.01)
G06F 11/36 (2006.01)

(52) U.S. Cl.
CPC ......... *G06F 11/3612* (2013.01); *G06F 11/36* (2013.01); *G06F 11/3604* (2013.01); *G06F 11/3636* (2013.01); *G06F 11/3664* (2013.01)

(58) Field of Classification Search
USPC ................................................ 717/124–133
See application file for complete search history.

(56) References Cited

U.S. PATENT DOCUMENTS

| | | | |
|---|---|---|---|
| 4,064,557 A | 12/1977 | Bluethman et al. | |
| 4,777,594 A | 10/1988 | Jones et al. | |
| 4,837,676 A | 6/1989 | Rosman | |
| 5,581,696 A | 12/1996 | Kolawa et al. | |
| 5,606,697 A * | 2/1997 | Ono | 717/159 |
| 5,729,728 A | 3/1998 | Colwell et al. | |
| 6,539,501 B1 * | 3/2003 | Edwards | 714/45 |
| 6,708,326 B1 | 3/2004 | Bhattacarya | |
| 7,020,768 B2 | 3/2006 | Swaine et al. | |
| 7,120,901 B2 * | 10/2006 | Ferri et al. | 717/128 |
| 2002/0184477 A1 | 12/2002 | Swaine | |
| 2005/0262131 A1 * | 11/2005 | Fitzpatrick | 707/102 |
| 2006/0101416 A1 * | 5/2006 | Callahan et al. | 717/128 |
| 2006/0259899 A1 | 11/2006 | Cooper et al. | |
| 2007/0234293 A1 * | 10/2007 | Noller | G06F 11/3688 717/124 |
| 2008/0155342 A1 | 6/2008 | O'Callahan | |
| 2008/0313602 A1 * | 12/2008 | Tillmann et al. | 717/106 |
| 2010/0088683 A1 * | 4/2010 | Golender et al. | 717/128 |

OTHER PUBLICATIONS

"Source Insight Help Contents", http://sourceinsight.com/docs35/ManualTOC.htm, (Downloaded Oct. 20, 2009).

(Continued)

*Primary Examiner* — Lewis A Bullock, Jr.
*Assistant Examiner* — Mark Gooray
(74) *Attorney, Agent, or Firm* — Schwegman Lundberg & Woessner, P.A.

(57) ABSTRACT

Techniques for debugging are presented. Executable instructions, as they are executed, along with variable values, as they appear when being processed, are output as an executable instruction set when an executable application comprising the executable instructions are processed. The outputted executable instruction set includes the processing flow sequence that occurred within the executable application when the executable application was processed.

10 Claims, 3 Drawing Sheets

(56) References Cited

OTHER PUBLICATIONS

"Structural Analysis for Java", http://www.alphaworks.ibm.com/tech/sa4j, (Mar. 1, 2004).
"Understand—Testimonials", http://www.scitools.com/products/understand/testimonials.php, (Downloaded Oct. 23, 2009).
Kerr, Kenny, "X64 Debugging With Pseudo Variables and Format Specifiers", http://msdn.microsoft.com/en-us/magazine/dd252945.aspx, (2009).
Van Heesch, Dimitri, "Doxygen—Source code documentation generator tool", http://www.stack.nl/~dimitri/doxygen/, Latest release v1.6.1, (Aug. 25, 2009).
Weidendorfer, Josef, "The KCachegrind Handbook", http://docs.kde.org/kde3/en/kdesdk/kcachegrind/index.html, Revision 0.4.6, (Jul. 27, 2004).

* cited by examiner

TECHNIQUES FOR GENERATING AN EXECUTABLE DEBUGGER SCRIPT

BACKGROUND

Enterprises have automated virtually every aspect of their businesses with software applications. A tremendous expense is incurred by these enterprises in support staff and in some cases development staff to maintain and develop these software applications.

Software is very difficult to definitively verify or certify before it is released into production as a product. This is because there are often many different branch points within a single application and the potential for virtually any kind of erroneous input data can occur during operation of the application. The difficulty becomes compounded when many applications are interfaced together to form a system of applications or a processing environment. In fact, often depending upon the size and complexity of an application it is mathematically impossible to verify that the application is error proof.

As a result, most if not all applications are released with latent errors that are only discovered during operation of those applications within disparate processing environments.

When an error is detected, a developer is usually consulted to resolve and fix the error. This process can be laborious and in many cases the process of finding the error can take much more time than fixing the error.

In a typical debugging scenario, a developer has the input data that generates the error, which is being analyzed by the developer. Usually, two approaches are used by the developer. The first is to insert break points into the software code of the application that is used by a debugging application to produce variable values for the developer to inspect as the input data works it way through the application being debugged. A second approach is for the developer to manually insert his/her own debugging code into the application that outputs a variety of information of interest to the developer when the input data works its way through the application.

Both of the above mentioned debugging approaches are largely trial and error approaches. They are both iterative approaches as well meaning that if the error is not located during one iteration additional break points or additional developer-inserted debugging statements are used by the developer until the error is found.

Accordingly, debugging remains an ad hoc technique where some existing market debuggers are used by developers in an effort to assist in the debugging process.

Thus, what are needed are improved techniques for debugging.

SUMMARY

In various embodiments, techniques for debugging are presented. More specifically, and in an embodiment, a method for debugging is provided. More specifically, input parameters are received for an executable application, and the executable application with the input parameters are processed on the processor. Next, an output file is generated; the output file identifies each instruction processed by the executable application and in the order in which that instruction was processed along with variable values for that instruction.

DETAILED DESCRIPTION

As used herein the phrase "executable application" refers to software instructions that are executed on one or more processors. In some cases, the instructions may be in a binary format produced from a compiled version of source code that is then linked to produce the executable, which is the executable application.

"Input parameters" refer to data that is passed as input to the executable application. This may include pointers to other files, pointers to objects, reference, text strings, etc.

"Variable values" refers to values assigned to variables that are used in connection with the executable application. Some variables may be explicitly defined within the executable application; other variables may be assigned by an Operating System (OS) or other software service for the processing environment within which the executable application processes.

According to an embodiment, the techniques presented herein are implemented in proxy-server products, directory-based products, storage-access based products, and/or operating-system products, distributed by Novell, Inc. of Provo, Utah.

Of course, the embodiments of the invention can also be implemented in a variety of products and/or devices. Any particular architectural layout or implementation presented herein is provided for purposes of illustration and comprehension only and is not intended to limit various aspects of the invention.

Figure 3:
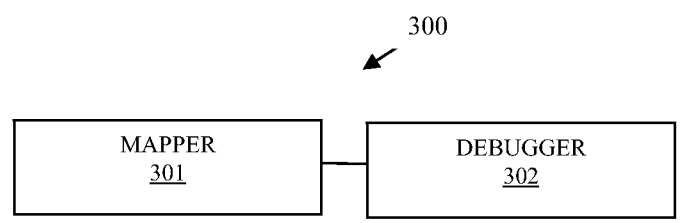
FIG. 3 is a diagram of a debugging system, according to an example embodiment.

It is within this initial context, that various embodiments of the invention are now presented with reference to the FIG. 1C3.

Figure 1:
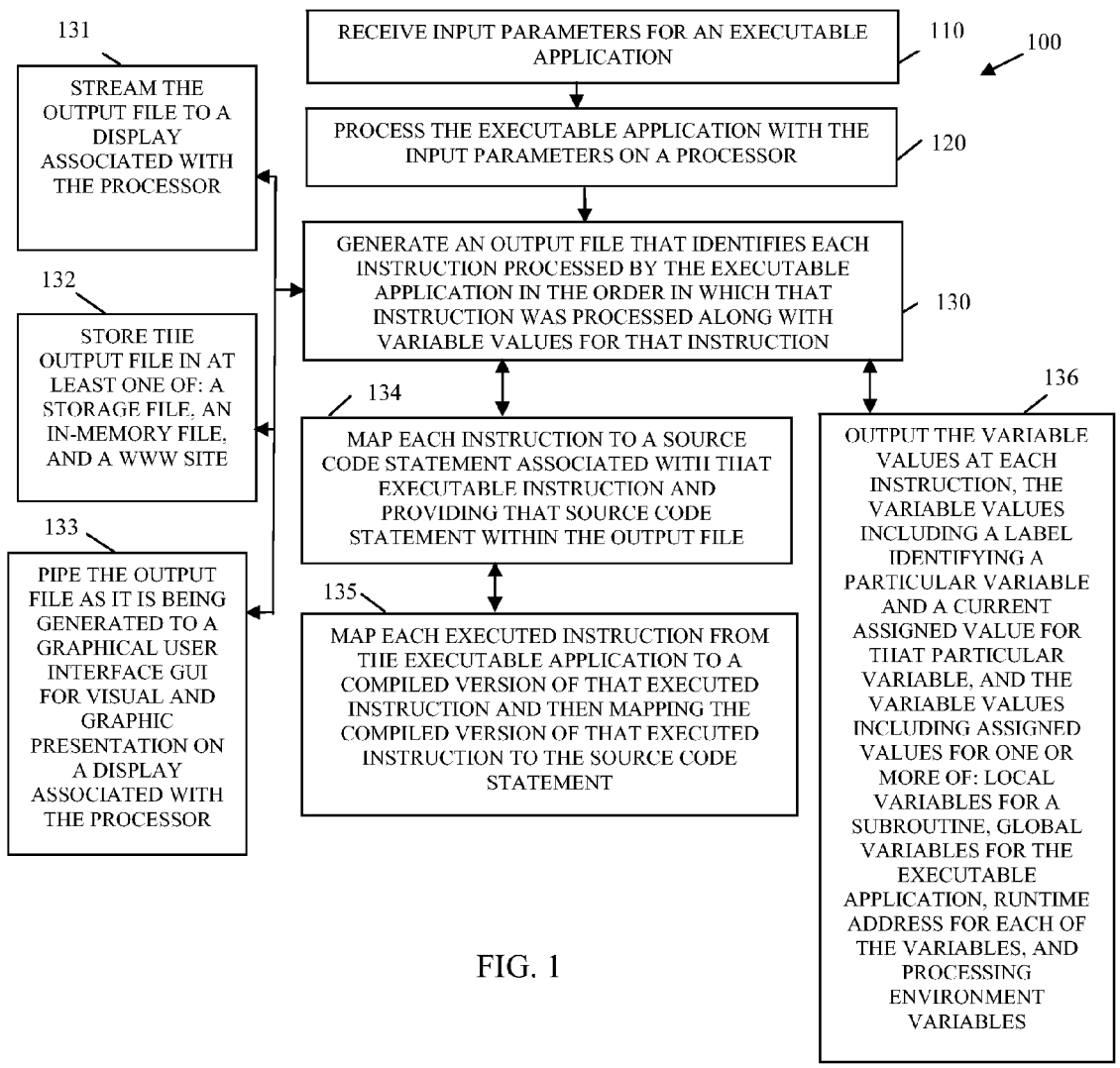
FIG. 1 is a diagram of a method for debugging, according to an example embodiment.

FIG. 1 is a diagram of a method 100 for debugging, according to an example embodiment. The method 100 (hereinafter "debugging service") is implemented as instructions in a machine-accessible and/or computer-readable storage medium. The instructions when executed by a machine (processing device (device having one or more processors and memory), computer, etc.) perform the processing depicted in FIG. 1. The debugging service may also be, in some embodiments, operational over and process within a communication network. The communication network may be wired, wireless, or a combination of wired and wireless.

In some cases, the processing device (one or more processors) that executes the debugging service is specifically configured to execute the instructions representing the debugging service.

At 110, the debugging service receives input parameters for an executable application. The executable application is one that is being debugged or is to be debugged by a developer (user). In an embodiment, the input parameters are values passed to the executable application that previously produced an error either in the program instructions for the executable application or in the expected output that was to be produced by the executable application.

At 120, the debugging service processes the executable application with the input parameters on the processor. Here, the executable application is being re-executed on the processor by a developer with the input values that may have previously produced an error.

It should also be noted that the error may not necessarily be incorrect processing in the executable application or incorrect output; the error may also be unexpected performance results (processing throughput or memory usage) detected by an end user or the developer when the executable application processes with the input values.

At 130, the debugging service generates an output file that identifies each instruction processed from the executable application and in the processing order (processing flow or sequence) that occurred when that instruction was processed. In addition, the output file also includes variable values for each instruction.

Unlike traditional approaches, the processing of 130 does not require any pre-compiled debugging statements to be manually inserted into the source code of the executable application. Moreover, the processing of 130 does not require a traditional debugging tool where a developer manually inserts break points into the executable application and then stepwise processes the executable application.

Additionally, the processing at 130 produces all or a configured portion of the processing sequence that occurs when the executable application is processed with the input parameters. So, the output file provides a complete view of the processing that occurs with the executable application.

For example, the output file may appear as (by way of example illustration only): Input parameters B; code statement (executable instruction) C, var1=X, var2=Y; code statement (executable instruction) D, var1=X, var2=Z, etc.

According to an embodiment, at 131, the debugging service streams the output file to a display associated with the processor. Here, a stream of the output file is sent to the display being viewed by the developer. The developer may pause or step through the streamed output file presented on the display.

In another case, at 132, the debugging service stores the output file in a storage file, an in-memory file, and/or at a World-Wide Web (WWW) site. In some cases, the output file is stored on a collaborative WWW site, such that more than one developer may view the output file and collaborate on its impact and/or resolution with each of the other developers. It is noted, that in some cases, an email may also be sent to a developer with the output file streamed in the body of the email, attached as an attachment to the email, or identified as a link within the email body that the developer can activated to navigate to a WWW site having the output file.

In still another situation, at 133, the debugging service pipes the output file as it is being generated to a graphical user interface (GUI) tool. Elements of components of the output file may then be graphically depicted on the display for visual inspection by a developer. Here, known anomalies associated with processing the executable application can be defined in the GUI tool and as the data associated with the output file is piped to the GUI tool, the presentation may unique call visual attention to these anomalies, such as via distinctive colors (e.g., red) and the like. This is done dynamically and not statically. This means that as runtime function calls, looping instructions, etc. process for the executable application the output file is dynamically piped and presented in graphical format and in real time for the developer to inspect via the GUI.

In a particular situation, at 134, the debugging service maps each instruction to a source code statement associated with that particular executable instruction. The source code statement is then provided within the output file. So, the developer does not have to try and match up an executable version of an instruction with where it occurs in the source code. In some cases, a hypertext link can be provided in the output file that permits the developer to navigate directly to the source code file to that particular statement and see all the contextual statements surrounding that statement. In this way, automated correction of any problem statements occurring within the source code can also be made in one working session by the developer.

Continuing with the embodiment of 134 and at 135, the debugging service maps each executable instruction from the executable application to a compiled version of that executed instruction. Next, each compiled version of a compiled instruction is mapped to a particular source code statement. This can be done by integrating within a compiler and/or linker loader. Alternatively, this can be done by understanding a compiler and linker/loader and how they produce compiled code and executable code from the initial source code.

In one case, at 136, the debugging service outputs with the output file the variable values at each instruction processed by the executable application. The variable values include a label that identifies a particular variable and a current processing value assigned to that particular variable when the executable application processes a particular executable instruction. The variable values can includes a variety of assigned values, such as but not limited to, local variables for a subroutine defined within the executable application, global variables for the entire executable application, runtime address for each of the variables, and/or processing environment variables (e.g., OS type, firmware version of process, time of day, etc.).

Figure 2:
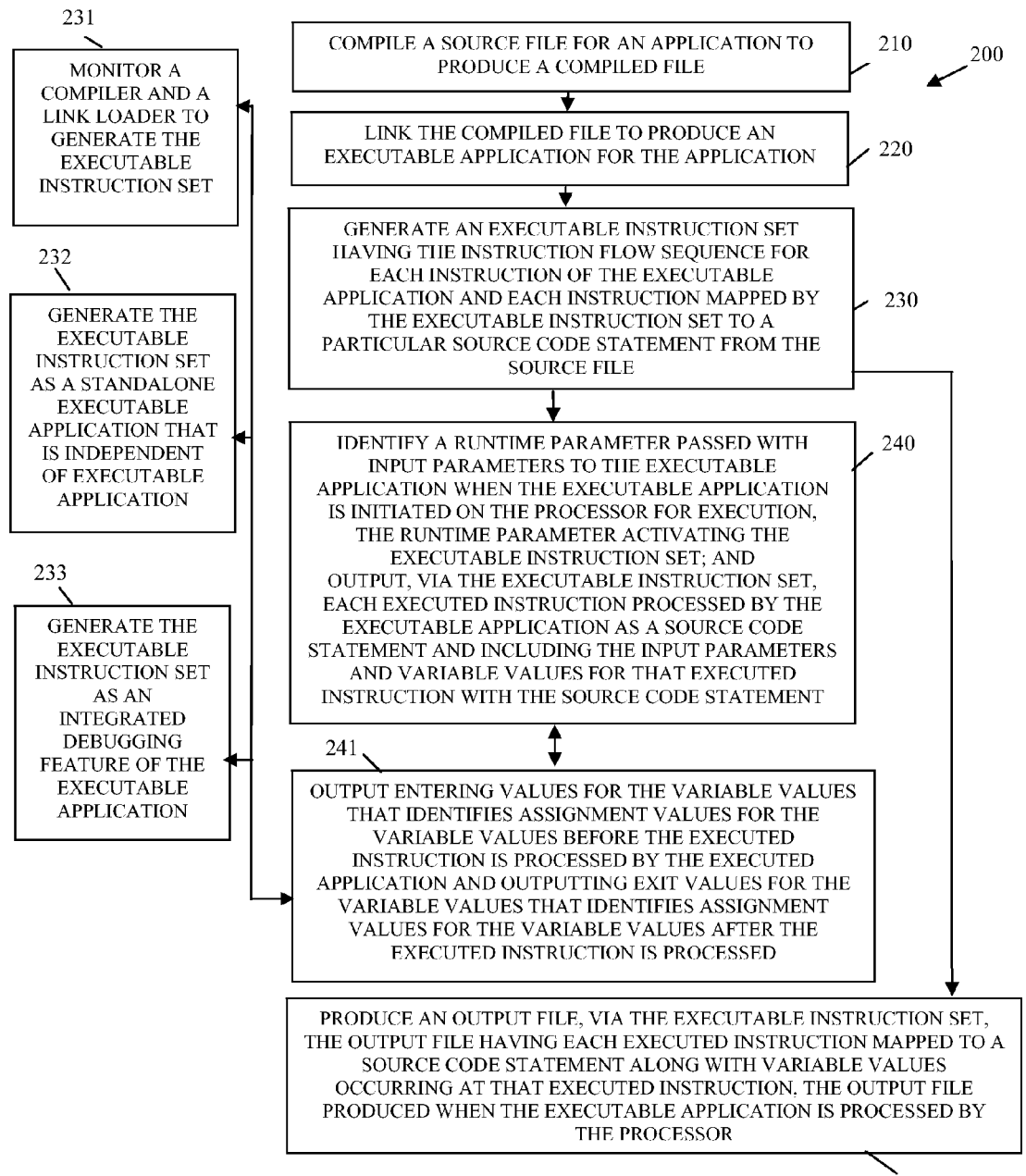
FIG. 2 is a diagram of another method for debugging, according to an example embodiment.

FIG. 2 is a diagram of another method 200 for debugging, according to an example embodiment. The method 200 (herein after referred to as "debugger") is implemented in and resides within a machine-accessible and computer-readable storage medium as instructions, which when processed by a machine (one or more processors, etc.) performs the processing depicted in the FIG. 2. The debugger may also be, in some embodiments, operational over a communication network. The network is wired, wireless, or a combination of wired and wireless.

The debugger represents another and in some cases enhanced perspective of the debugging service presented in detail above with respect to the method 100 for the FIG. 1.

At 210, debugger compiles a source file for an application to produce a compiled file. Here, the debugger is either integrated into and as an enhancement to a compiler or the debugger is configured to take action while or after a compiler produces the compiled file to perform the remaining processing discussed herein and below.

At 220, the debugger links the compiled file to produce an executable application for the application. Again, the debugger is either integrated into a link loader or is an enhancement to the link loader. In still another case, the debugger is configured to take action while or after the link loader produces the executable application.

At 230, the debugger generates an executable instruction set. The executable instruction set identifies the processing flow sequence for each instruction of the executable application. Moreover, each instruction is mapped by the executable instruction set to a particular source code statement from a source file representing the original application before it was compiled and link loaded into the executable application.

According to an embodiment, at 231, the debugger monitors a compiler and a link loader to generate the executable instruction set. That is, during the processing at 210 and 220, the debugger integrates itself therewith or thereafter to produce or create the executable instruction set.

In an embodiment, at 232, the debugger generates the executable instruction set as a standalone application that is independent of the executable application. In this manner, the executable instruction set is a separate script that is independently processed when the executable application is processed.

In another case, at 233, the debugger generates the executable instruction set as an integrated debugging feature of the executable application. That is, a processing parameter may activate the executable instruction set when that processing parameter is passed to the executable application upon initiation of that executable application on the processor.

So, in some embodiments, at 240, the debugger identifies a runtime parameter passed with other input parameters to the executable application when that executable application is initiated on the processor for execution. The runtime parameter initiates activates the executable instruction set. Next, the debugger outputs, using the executable instruction set, each executed instruction being processed by the executable application as a source code statement and along with that source code statement the original input parameters and variable values for each executed instruction are outputted.

Continuing with the embodiment of 240 and at 241, the debugger outputs entering values for the variable values. The entering (starting) values identify assignment values for the variable values before the executable instruction is processed by the executable application. The debugger also outputs exit values for the variable values. The exit values identify assignment values for the variable values after the executable instruction is processed. So, the variable values are outputted with source code statement in duplicate with one set of values representing a state of the variables before a particular instruction is executed and the other set of values representing a different state for the variables after the instruction is executed.

In another situation, at 250, the debugger produces an output file using the executable instruction set. The output file having each executed instruction mapped to a source code statement along with variable values occurring at that executed instruction. The output file is produced when the executable application is processed by the processor.

FIG. 3 is a diagram of a debugging system 300, according to an example embodiment. The debugging system 300 is implemented as instructions on one or more processing devices. These processing devices are specifically configured to process the debugging system 300. The debugging system 300 may also be, in some embodiments, operational over a communication network. The communication network is wired, wireless, or a combination of wired and wireless.

In an embodiment, the debugging system 300 implements, among other things, the methods 100 and 200 of the FIGS. 1 and 2, respectively.

The debugging system 300 includes a mapper 301 and a debugger 302. Each of these and their interactions with one another are now discussed in turn.

The mapper 301 is implemented in a computer-readable storage medium and executes on the one or more processors of a network. Example aspects of the mapper 301 were discussed above with reference to the methods 100 and 200 of the FIGS. 1 and 2, respectively.

The mapper 301 is configured to map executable instructions from an executable application to source code statements associated with the executable instructions. The mapping is done in the flow sequence that appears or occurs in the executable application.

According to an embodiment, the mapper 301 is configured within the processing of a compiler and/or link loader as an enhanced version of that compiler and/or link loader.

In another case, the mapper 301 is configured to be activated via a processing option passed to the executable application when that executable application is processed. Here, the processing option may be directly passed to the executable application as a processing parameter or may be set as an environmental variable defined in a processing environment where the executable application is processing.

The debugger 302 is implemented in a computer-readable storage medium and executes on the one or more processors of the network. Example processing associated with the debugger 302 was discussed in detail above with reference to the methods 100 and 200 of the FIGS. 1 and 2, respectively.

The debugger 302 is configured to produce output when the executable application is processed. The output having the source code statement(s) processed in the executable application. The output also having variable values as those variable values are assigned by the executable application.

According to an embodiment, the debugger 302 is configured to activate the executable application for processing. Here, the developer can provide an identifier to the debugger 302 and input parameters and the debugger 302 initiates the executable application.

In another case, the debugger 302 is configured to depict the source code statements in the flow sequence along with the variable values within a GUI and on a display device associated with the one or more processors. Such a situation was discussed above with reference to the method 100 of the FIG. 1.

Continuing with the previous case, the debugger 302 is also configured, in some embodiments, to pipe the source code statements in the flow sequence with the variable values to a different executable application for further automated analysis by that different executable application.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor, the processor configured to perform the method comprising:
   compiling a source file for an application to produce a compiled file;
   linking the compiled file to produce an executable application for the application;

generating an executable instruction set during the compiling and linking performed by a compiler and a linker, respectively, the executable instruction set having the instruction flow sequence for each instruction of the executable application and each instruction of the instruction set mapped by that executable instruction to a particular source code statement from the source file representing the application before it was compiled and linked into the executable application for a particular instruction of the executable application, the executable instruction set provides debugging of the executable application when the executable application is executed and the executable instruction set is independent of the executable application, the executable instruction set is activated and executed when the executable application is executed, and wherein the executable application does not include any pre-compile debugging statements, and wherein the executable instruction set is a separate script that is independently processed when the executable application is processed based on a parameter passed to the executable application; and wherein when the executable is initiated on the processor for execution, identifying a runtime parameter passed with input parameters to the executable instructions and in response to the runtime parameter activating the executable instruction set, and outputting, via the executable instruction set, each executed instruction processed by the executable application as a source code statement with input parameters and variable values for that executed instruction.

2. The method of claim 1, wherein outputting further includes outputting entering values for the variable values that identifies assignment values for the variable values before the executed instruction is processed by the executed application and outputting exit values for the variable values that identifies assignment values for the variable values after the executed instruction is processed.

3. The method of claim 1 further comprising, producing an output file, via the executable instruction set, the output file having each executed instruction mapped to a source code statement along with variable values occurring at that executed instruction, the output file produced when the executable application is processed by the processor.

4. The method of claim 1, wherein generating further includes monitoring the compiler and the link loader to generate the executable instruction set.

5. The method of claim 1, wherein generating further includes generating the executable instruction set as an integrated debugging feature of the executable application.

6. A debugging system implemented on one or more processors, comprising:

a mapper implemented in a computer-readable storage medium and to process on one or more of the processors of a network, wherein the mapper includes an executable script; and a debugger implemented in a computer-readable storage medium and to process on one or more of the processors of the network; the mapper is configured to map executable instructions from an executable application to source code statements associated with the executable instructions in a flow sequence that appears in the executable application when the executable application is executed, and the debugger is configured to produce output when the executable application is processed by processing the mapper with the executable application, the output depicting each source code statement processed in the executable application along with variable values as those variable values are assigned by the executable application during execution of the executable application to a particular executable instruction executed from the executable application that assigned the variable values, and each executable instruction of executable instruction set for the mapper maps to a particular source code statement from a source file representing an original application as source code before it was compiled and link loaded into the executable application and each executable instruction of the executable application, wherein the mapper is independent of the executable instructions for executable application, and wherein the executable application does not include any pre-compile debugging statements, and wherein the mapper is a separate script that is independently processed when the executable instructions of the executable application is processed, and the executable script is generated during compiling and linking the source code statements when producing the executable instructions for the executable application, and the debugger processes the executable script representing the mapper when the executable application is executed based on the particular input parameter being passed with initiation of the executable application.

7. The system of claim 6, wherein the debugger is configured to be activated via a processing option passed to the executable application when that executable application is processed.

8. The system of claim 6, wherein the debugger is configured to activate the executable application for processing.

9. The system of claim 6, wherein the debugger is configured to depict the source code statements in the flow sequence along with the variable values within a graphical user interface and on a display device associated with the one or more processors.

10. The system of claim 9, wherein the debugger is configured to pipe the source code statements in the flow sequence with the variable values to a different executable application for further analysis by that different executable application.

* * * * *